Figure 1:
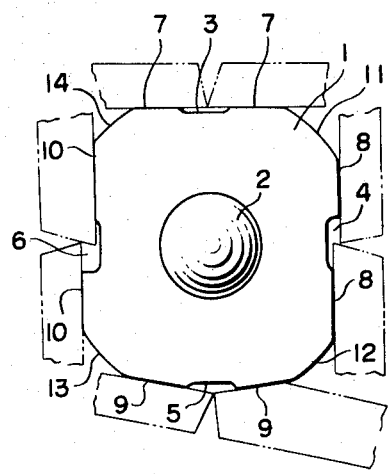

May 17, 1966  MASAHIRO KAWASAKI ET AL  3,251,527
APPARATUS COMPRISING A BACKING STRIP FOR
AUTOMATIC SINGLE-SIDE WELDING

Filed Nov. 9, 1964  3 Sheets-Sheet 1

INVENTOR.
MASAHIRO KAWASAKI
TADASHI HAYASHIDA
BY

ATTORNEYS

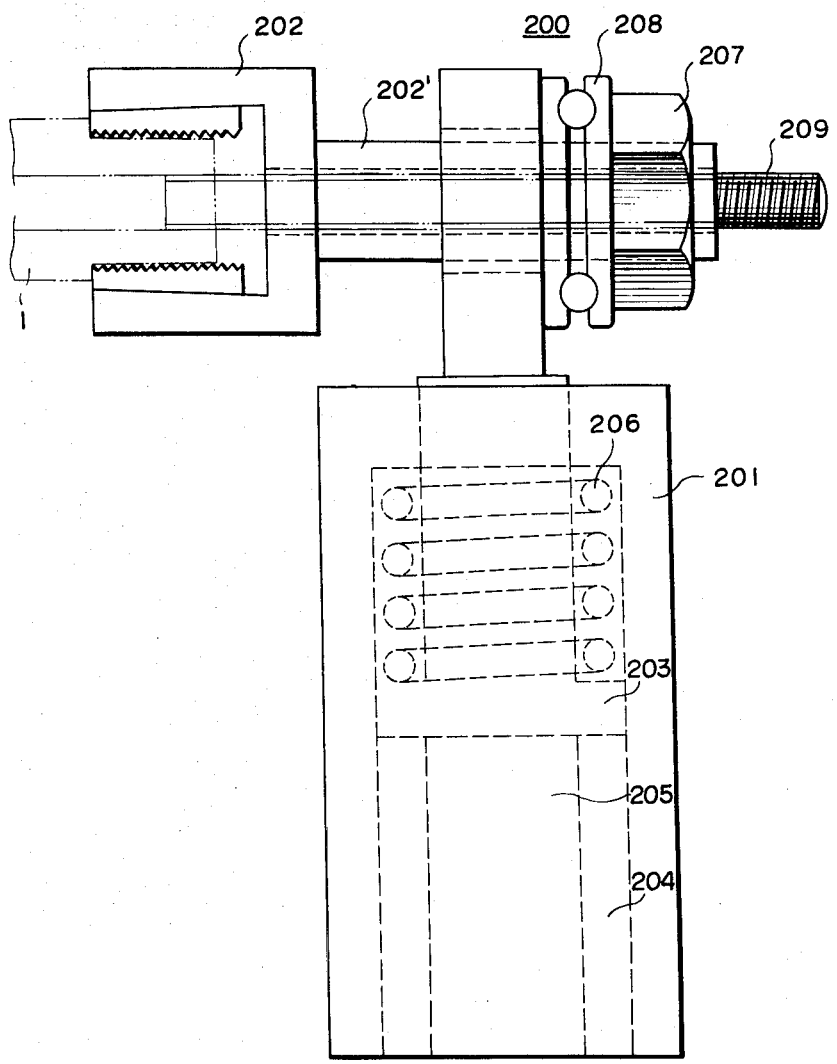

United States Patent Office 3,251,527
Patented May 17, 1966

3,251,527
APPARATUS COMPRISING A BACKING STRIP FOR AUTOMATIC SINGLE-SIDE WELDING
Masahiro Kawasaki and Tadashi Hayashida, Nagasaki-shi, Japan, assignors to Mitsubishi Jukogyo Kabushiki Kaisha, Tokyo, Japan
Filed Nov. 9, 1964, Ser. No. 409,900
Claims priority, application Japan, Nov. 29, 1963, 38/63,761
2 Claims. (Cl. 228—50)

The present invention relates to a backing strip pressed against the backs of the bevelled portions of base metals being made to touch each other, and to an apparatus for supporting and elevating the backing strip, in case of automatic single-side welding.

In automatic single-side flat welding, a backing strip is generally used for obtaining a welded joint. In this case, in order to make the shape of the back-bead perfect, it is necessary to press the backing strip with high accuracy against the backs of the bevelled portions of base metals. On the other hand, base metals vary in thickness according to the uses thereof. If welding is performed for these base metals, the back of the welded part is always provided with a stepped face. Therefore, the backing strip used in such automatic single-side welding has to be provided with a stepped surface, on which the backing strip is pressed against the backs of the base metals. Grooves of the backing strip which receive various back beads also vary in shape.

As described above, in automatic single-side welding there are various cases in which base metals have the same thickness, or vary slightly or exceedingly in thickness. Formerly, for each of joints, a proper backing strip was selected among the various kinds of backing strips which had been prepared and was used for performing each automatic single-side welding. By this procedure, however, the installation would be very large and the cost would be higher, because various shapes of backing strips had to be made and stored in preparation for such welding. It was also necessary to exchange such backing strips in each welding. Therefore, much working time and labour would be required.

To eliminate the above-mentioned disadvantages, a proposal was made, by which a backing strip for performing automatic single-side welding was, on the single surface thereof, provided with a plurality of kinds of grooves for receiving the back-beads at the backs of various base metals varying in thickness. The outside faces adjoining to the grooves of the backing strip were so flat as to be pressed against the backs of both sides of the bevelled portions of the base metals, while the back side of the backing strip was provided with a cooling-water pipe, which was fixed thereto by welding. Indeed the efficiency was remarkably raised by using such a backing strip in automatic single-side welding, but the backing strip was necessarily subjected to deformations which resulted from that the backing strip was plate-shaped due to local heatings caused by welding. Besides, the welding accuracy was badly influenced, because the contact face between the backing strip and the base metals became wider. Owing to the provision of the cooling-water pipe which was required for cooling the plate-shaped backing strip, the construction of the backing strip was so complicated that the method by which said pipe was fixed to the backing strip became more difficult.

An object of the present invention is to eliminate disadvantages to which reference has been made. According to the invention, an apparatus is provided, which is characterized by that a metal-tube backing strip is, on the cylindrical part, provided with several groove-shaped notches selectively usable according to the shapes of the backs of the bevelled portions of base metals and provided with the flat surfaces adjoining to said notches, while the backing strip is, in the interior, provided with a hole for flowing a cooling medium. The apparatus of the present invention is, further, characterized by that both ends of the metal-tube backing strip provided with, on the cylindrical part, several groove-shaped notches selectively usable according to the shapes of the backs of the bevelled portions of base metals and provided with the flat surfaces adjoining to said notches are grasped by stretching means for rotatably pulling and elevating said backing strip, while the cylindrical part of the backing strip is at proper points supported by supporting means for rotatably supporting and vertically elevating the backing strip.

It is clear that the apparatus of the invention is very convenient, because the exchange of the backing strip is not required but the only turning of the metal-tube backing strip is necessary for selecting the desired surface of the backing strip, Besides, the whole apparatus may be constructed with ease, because any special cooling is not required but a cooling medium such as water has only to be fed to the cooling hole provided in the interior of the backing strip. As a result, the apparatus of the invention is very useful for automatic single-side welding.

Figure 2:
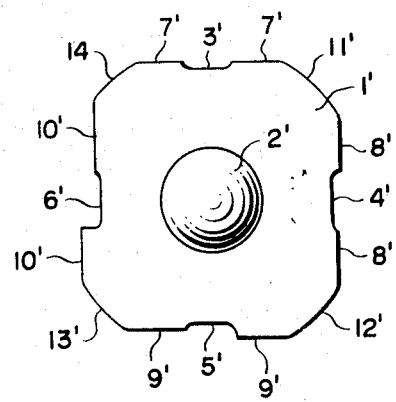
Figure 3:
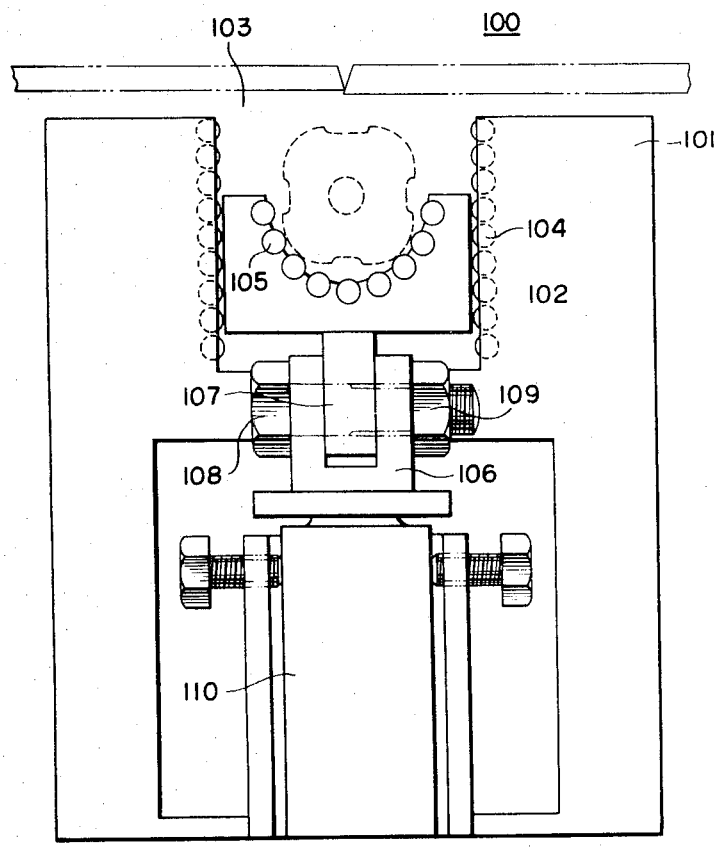

An embodiment of the invention will be explained with reference to the accompanying drawings, wherein:

FIG. 1 is a cross-sectional view of a backing strip of the invention, said backing strip being provided with various grooves for receiving a back-bead, FIG. 2 is a cross-sectional view similar to FIG. 1 but showing another kind of grooves, FIG. 3 is a cross-sectional view showing means for supporting and elevating the extended portions of the backing strip of the invention, and FIG. 4 is a cross-sectional view showing means for grasping and pulling in opposite directions both ends of the backing strip for adjusting the rotational position thereof.

Referring to FIG. 1, 1 designates a backing strip consisting of a profile tube, which is made of metal having a high thermal conductivity and a high melting point and yet flexibility, such as copper. The central hole 2 of said tube serves to flow a cooling medium, such as water, while the outside surface of said tube is provided with various grooves 3, 4, 5 and 6 suitable for receiving back-beads caused by the automatic single-side weldings of various base metals. Both upper surfaces thus obtained 7, 7; 8, 8; 9, 9; 10, 10 are pressed against the respective base metals in order to prevent the molten metal from overflowing the grooves. Arc parts 11, 12, 13 and 14 are provided between the two flat surfaces neighbouring to each other. In the embodiment described above, the groove 3 is usable for the base metals having the same thickness, while the groove 4 is usable for the base metals having the difference in thickness $d=0–1.5$ mm., the groove 5 is usable for the difference in thickness $d=1.5–3.0$ mm., and the groove 6 is usable for the difference in thickness $d≧3.0$ mm., A backing strip shown in FIG. 2 is substantially similar to that in FIG. 1. The central hole 2' of the metal-tube backing strip 1' serves, likewise, for the purpose of cooling. However, grooves provided on the outside surface of the backing strip are usable for the cases in which the difference ($d$) in thickness between the base metals is more severely limited for the better accuracy in welding. Namely, the groove 3' is usable for $d=0$, the groove 4' is usable for $d=0–1$ mm., the groove 5' is usable for $d=1–2$ mm., and the groove 6' is usable for $d=2–3$ mm. Besides, flat surfaces 7', 7'; 8', 8'; 9', 9'; 10', 10' are formed on both upper ends of the grooves 3', 4', 5' and 6', respectively, while arc parts 11', 12', 13' and 14' are provided between the two flat surfaces, as shown in FIG. 2.

Means for supporting such metal-tube backing strip 1 or 1', designated by 100 in FIG. 3, is intended for pressing said backing strip against the backs of the bevelled portions of base metals. A body 101 of the backing-strip supporting means 100 is grooved, in the middle part thereof, in such a way that a backing-strip holder 102 fits in this groove 103 to be movable up and down through a plurality of bearings 104 inserted into said groove. The upper surface of the holder 102 is formed to be concave, said surface being thus suitable for the reception of the metal-tube backing strip 1 through bearings 105 provided on the concaved wall of the holder 102. Further, the holder 102 is supported by means of a holder support 106 through an eyeplate 107, a bolt 108 and a nut 109, said support being, for the upward and downward movements thereof, connected with a holder-elevating device 110 such as a known oil jack. Said device 110 is fixed, at the normal position, by means of an adjusting device 111. Next, means for stretching the above-mentioned backing strip 1, 1', designated by 200 in FIG. 4, is intended for pressing said backing strip against the backs of the beveled portions of base metals. A body 201 of the backing strip stretching means 200 is provided with a groove 204, in which a holder support 203 is made to fit movably up and down. The holder support 203 is provided to support a backing-strip holder 202, which is engaged with one end of the metal-tube backing strip 1. An elevating device 205 such as a known oil jack is provided within the groove 204, while a spring 206 is also provided therein so as to press the support 203 against the elevating device 205. The holder 202 is supported by means of the holder support 203 through a hollow shaft 202' of the holder, said shaft being provided in the axial direction of the metal-tube backing strip 1. A nut 207 which serves to adjust the rotational and horizontal positions of the holder 202 through a thrust bearing 208 is engaged with the free end portion of the hollow shaft 202'. A feeding pipe 209 is provided at the end of the hollow shaft 202' to feed a cooling medium to the hole 2 of the backing strip.

In case of the automatic single-side welding, by the use of the above backing-strip, of base metals such as steel plates of a hull, these plates are generally 10–15 m. or more in length, said backing strip being necessarily as long as the base metals or longer than the base metals. Accordingly, the length of the backing strip 1 or 1' of the present invention should be so decided as to correspond to that of the back of the bevelled portion of the base metal. To do so, first, a plurality of metal tubes having the same inside and outside diameters are successively joined by welding in order that a metal tube which is long enough to be used as a backing strip even for the welding of long base metals may be obtained. Next, the grooves 3, 4, 5, 6 or 3', 4', 5', 6' and the flat surfaces adjoining to said grooves 7, 7; 8, 8; 9, 9; 10, 10 or 7', 7'; 8', 8'; 9', 9'; 10', 10' are respectively formed along the total length of the metal tube stated above, as shown in FIGS. 1 and 2. In case of the use of the metal-tube backing strip thus obtained 1 or 1', it is first necessary to grasp both ends of said backing strip by means of the stretching means 200, and, at the same time, to support the whole backing strip at the proper points thereof by means of the supporting means 100 provided at an interval of for instance 3–5 meters. This backing strip is placed between base-metal supporting means (not shown) in a welding shop. There are two ways of installing the whole apparatus according to the present invention; namely, fixing the apparatus directly in the shop or placing the apparatus on the means by which said apparatus may be shifted in the transverse or longitudinal direction. The base metals to be joined by butt welding are carried onto the place where the above apparatus is installed, said metals being placed on the base-metal supporting bed in such a way that the bevelled portions of the base metals are roughly positioned above a groove of the metal-tube backing strip. After the completion of this positioning, the holders 202 of the stretching means 200 which grasp both ends of the metal-tube backing strip 1 are fed outward by means of the nuts 207 in order to make said backing strip tense, while the holders 202 are turned so that a groove usable for the difference in thickness between the base metals may be selected. Next, both the elevating devices 205 of the stretching means 200 and the holder-elevating devices 110 of the supporting mans 100 are mechanically or by hand elevated so as to press the flat surfaces of the metal-tube backing strip 1 against the backs of the bevelled portions of the base metals. Now, automatic single-side welding is performed on the outsides of the base metals.

According to the apparatus of the present invention, neither the conventional exchange of the backing strip nor the carrying of the base metals is required. In other words, the most proper surface of the metal-tube backing strip 1 or 1', which is held by means of the stretching means 200 and the supporting means 100, may be selected only by the turning of said backing strip, said surface being pressed against the backs of the bevelled portions of the base metals by means of the elevating devices 205 and the holder-elevating devices 110. Both the turning and the elevation of the backing strip 1, 1' may be very accurately and yet easily performed, because the backing strip is subjected to tension by means of the nuts 207 while the bearings 105 usable for the turning, the bearing 104 usable for the elevation, and the elevation-adjusting device 111 are provided. Besides, after the pressing having been performed, local torsions of the backing strip due to the adjustment of the holder-elevating device 110 may increase the degree of contact between the narrow flat surfaces of the backing strip and the backs of the bevelled portions of the base metals. As a result, the welding effect may be increased. Further, according to the apparatus of the present invention, the sufficient cooling-effect may be obtained without any separate cooling means, because the metal-tube backing strip is, in the center of section thereof, provided with the cooling-water pipe by which cooling is performed for decreasing the local deformations of the backing strip due to the thermal stress caused by welding.

It is to be understood, of course, that numerous modifications may be made without departing from the spirit and scope of the present invention as set forth in the appended claims.

Having thus described the invention, what is claimed as new and desired to be secured by Letters Patent, is:

We claim:

1. An apparatus comprising a tubular backing member for automatic single-side welding, the periphery of said tubular backing member being provided with several flat surfaces interconnected by cylindrical surfaces, each of said flat surfaces being provided with groove-shaped notches therein selectively usable according to the shapes of the backs of the bevelled portions of base metals which are to be welded together, said tubular backing member being hollow for the reception of a cooling medium.

2. An apparatus comprising a tubular backing member for automatic single-side welding, support means for rotatably supporting and vertically elevating said backing member, and stretching means for rotatably pulling and elevating said backing member while said backing member is supported by said supporting means, said tubular backing member being comprised of several flat surfaces, each said flat surface being provided with groove-shaped notches therein selectively usable according to the shapes of the backs of the bevelled portions of base metals which are to be welded together.

No references cited.

WHITMORE A. WILTZ, *Primary Examiner.*

M. L. FAIGUS, *Examiner.*